(12) United States Patent
Benjebbour et al.

(10) Patent No.: US 9,385,794 B2
(45) Date of Patent: Jul. 5, 2016

(54) MOBILE TERMINAL APPARATUS, RADIO BASE STATION APPARATUS AND RADIO COMMUNICATION METHOD

(75) Inventors: Anass Benjebbour, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 208 days.

(21) Appl. No.: 14/002,925

(22) PCT Filed: Feb. 21, 2012

(86) PCT No.: PCT/JP2012/054174
§ 371 (c)(1),
(2), (4) Date: Sep. 3, 2013

(87) PCT Pub. No.: WO2012/121008
PCT Pub. Date: Sep. 13, 2012

(65) Prior Publication Data
US 2014/0003272 A1 Jan. 2, 2014

(30) Foreign Application Priority Data
Mar. 4, 2011 (JP) ................................ 2011-047972

(51) Int. Cl.
*H04B 7/04* (2006.01)
*H04B 7/02* (2006.01)
(Continued)

(52) U.S. Cl.
CPC .............. *H04B 7/0456* (2013.01); *H04B 7/024* (2013.01); *H04B 7/0639* (2013.01);
(Continued)

(58) Field of Classification Search
CPC .... H04B 7/024; H04B 7/0417; H04B 7/0456; H04B 7/0632; H04B 7/0639; H04B 7/0695; H04J 11/0033; H04J 11/0053; H04J 2211/005; H04L 25/03898; H04L 25/03949
USPC ................................................. 370/252, 328
See application file for complete search history.

(56) References Cited

U.S. PATENT DOCUMENTS 8,355,340 B2    1/2013    Zhu et al.
8,831,654 B2 *  9/2014    Kim ..................... H04B 7/0634
                                                              455/114.2
(Continued)

FOREIGN PATENT DOCUMENTS

JP    2002-238073 A    8/2002
JP    WO 2010146964 A1 *  12/2010 .............. H04L 5/001
JP    2011-035912 A    2/2011

OTHER PUBLICATIONS

Notification of Reasons for Rejection in corresponding Japanese application No. 2011-047972 dated May 7, 2013 (5 pages).
(Continued)

*Primary Examiner* — Un C Cho
*Assistant Examiner* — Shah Rahman
(74) *Attorney, Agent, or Firm* — Osha Liang LLP

(57) ABSTRACT

To provide a mobile terminal apparatus, radio base station apparatus and radio communication method that enable accurate precoding weights to be generated in coordinated multipoint transmission, a radio communication method of the invention is characterized in that a mobile terminal apparatus (10) performs channel estimation using a downlink reference signal, selects a PMI using the obtained channel estimation value, measures an IQI using at least the channel estimation value and the PMI, and transmits at least the PMI and IQI to a radio base station apparatus, and that the radio base station apparatus generates precoding weights using the PMI and IQI, and performs coordinated multipoint transmission utilizing MIMO transmission using the precoding weights.

9 Claims, 5 Drawing Sheets

(51) Int. Cl.
H04B 7/06 (2006.01)
H04L 25/03 (2006.01)
H04J 11/00 (2006.01)

(52) U.S. Cl.
CPC ............ *H04B 7/0417* (2013.01); *H04B 7/0632* (2013.01); *H04B 7/0695* (2013.01); *H04J 11/0033* (2013.01); *H04J 11/0053* (2013.01); *H04J 2211/005* (2013.01); *H04L 25/03949* (2013.01)

(56) References Cited

U.S. PATENT DOCUMENTS

| | | | | |
|---|---|---|---|---|
| 9,210,592 | B2 * | 12/2015 | Davydov | H04B 7/0689 |
| 2002/0115427 | A1 | 8/2002 | Hayashi et al. | |
| 2007/0207828 | A1 * | 9/2007 | Cheng et al. | 455/522 |
| 2009/0046569 | A1 * | 2/2009 | Chen et al. | 370/203 |
| 2010/0034093 | A1 * | 2/2010 | Roh | H04B 7/0417 370/241 |
| 2010/0255790 | A1 * | 10/2010 | Farajidana | H04B 17/26 455/69 |
| 2010/0272018 | A1 * | 10/2010 | Furueda et al. | 370/328 |
| 2010/0322176 | A1 * | 12/2010 | Chen et al. | 370/329 |
| 2011/0032835 | A1 * | 2/2011 | Zhu et al. | 370/252 |
| 2011/0306350 | A1 * | 12/2011 | Barbieri et al. | 455/450 |
| 2012/0033571 | A1 * | 2/2012 | Shimezawa | H04B 7/026 370/252 |
| 2012/0099553 | A1 * | 4/2012 | Aiba | H04L 5/001 370/329 |

OTHER PUBLICATIONS

M. Sadek et al., "A Leakage-Based Precoding Scheme for Downlink Multi-User MIMO Channels"; IEEE Transactions on Wireless Communications, vol. 6, No. 5; May 2007, pp. 1711-1721 (11 pages).

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).

International Search Report for corresponding International Application No. PCT/JP2012/054174, mailed Apr. 24, 2012 (4 pages).

* cited by examiner

MOBILE TERMINAL APPARATUS, RADIO BASE STATION APPARATUS AND RADIO COMMUNICATION METHOD

TECHNICAL FIELD

The present invention relates to a mobile terminal apparatus, radio base station apparatus, and radio communication method, and more particularly, to a mobile terminal apparatus, radio base station apparatus, and radio communication method that support multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

Meanwhile, in the LTE-scheme system, MIMO (Multi Input Multi Output) systems are proposed as radio communication techniques for transmitting and receiving data using a plurality of antennas and improving a data rate (spectral efficiency) (for example, see Non-patent Document 1). In the MIMO systems, the transmitter/receiver is provided with a plurality of transmission/reception antennas, and simultaneously transmits different transmission information sequences from different transmission antennas. Meanwhile, the receiver side exploits the fact that different fading variations occur in between transmission and reception antennas, and divides the simultaneously-transmitted information sequences to detect, and it is thereby possible to increase the data rate (spectral efficiency).

In the LTE-scheme system, specified are Single User MIMO (SU-MIMO) transmission in which transmission information sequences simultaneously transmitted from different transmission antennas are all for the same user and Multiple User MIMO (MU-MIMO) transmission in which the transmission information sequences are for different users. In the SU-MIMO transmission and MU-MIMO transmission, the receiver side selects an optimal PMI (Precoding Matrix Indicator) from a codebook that defines a plurality of phase/amplitude control amounts (precoding matrixes (precoding weights)) to set on antennas of the transmitter and PMIs associated with the precoding matrixes, and transmits the PMI to the transmitter as feedback. The transmitter side performs precoding on each transmission antenna based on the PMI that is transmitted from the receiver as feedback, and transmits transmission information sequences. As typical precoding techniques, there are ZF (Zero Forcing), BD (Block Diagonalization) ZF, MMSE (Minimum Mean Square Error), SLNR (Signal to Leakage plus Noise Ratio), etc.

Herein, attention is directed toward SLNR precoding. In SLNR precoding, a value is maximized which is obtained by dividing power of a desired signal received in a receiver (herein, mobile terminal apparatus) by the sum of interference caused by "leakage" of a signal in another mobile terminal apparatus in the coordinated cluster, noise and all power. In calculating precoding weights by SLNR precoding, the need arises for an average reception SINR (Signal to Interference plus Noise Ratio) in the mobile terminal apparatus (for example, see Non-patent Document 2).

CITATION LIST

Non-Patent Literature

[Non-Patent Literature 1] 3GPP TR 25.913 "Requirements for Evolved UTRA and Evolved UTRAN"

[Non-Patent Literature 2] M. Sadek et al., "A leakage-based precoding scheme for downlink multi-user MIMO channels," IEEE Trans. Wireless Commun., vol. 6, no. 5, pp. 1713, May 2007.

As one of promising techniques to further improve system performance of Rel-8 LTE system, there is inter-cell orthogonalization. In LTE systems of Rel-10 or later (LTE-A system), intra-cell orthogonalization is achieved by orthogonal multiple access both in uplink and downlink. In other words, in downlink, mobile terminal apparatuses (User Equipments) are orthogonalized in the frequency domain. However, for inter-cell, interference randomizing by 1-cell frequency reuse is a base as in W-CDMA. The 3GPP (3rd Generation Partnership Project) has studied Coordinated Multipoint (CoMP) transmission/reception as techniques for actualizing inter-cell orthogonalization. In CoMP transmission/reception, a plurality of cells coordinates to perform signal processing of transmission and reception on a single or a plurality of mobile terminal apparatuses (UEs). More specifically, studied in downlink are multi-cell simultaneous transmission applying precoding, coordinated scheduling/beamforming and the like.

In the case of applying downlink coordinated scheduling/beamforming transmission using SLNR precoding, by using instantaneous channel quality information CQI (Channel Quality Indicator) and PMI that are transmitted from the mobile terminal apparatus to the radio base station apparatus as feedback, an average reception SINR is calculated using the instantaneous CQI (following equations (1) and (2)).

$$CQI_i^j = \frac{\|H_i^j F_i^j\|^2 \times P_{avg,j}}{ICI_i + N_i} \quad \text{CQI feedback from a mobile terminal apparatus } i \quad \text{Eq. (1)}$$

i,j: 1, 2, . . . (numbers of mobile terminal apparatus i and radio base station apparatus j)

$H_i^j$: Downlink channel state between the radio base station apparatus j and mobile terminal apparatus i $F_i^j$: PMI feedback from the mobile terminal apparatus i $P_{avg,j}$: Average total transmission power from the radio base station apparatus j $ICI_i$: Interference from a cell that does not belong to a CoMP set in the mobile terminal apparatus i $N_i$: Average noise of a receiver in the mobile terminal apparatus i Herein, since the mobile terminal apparatus i is connected to the radio base station apparatus i, the radio base station apparatus i is called the serving base station of the mobile terminal apparatus i, and another radio base station apparatus j≠i in the cluster is called the coordinating base station.

$$_i^j CQI_i^j = \frac{\|H_i^j F_i^j\|^2 \times P_{avg,j}}{ICI_i + N_i} \quad \text{Eq. (2)}$$

However, the transmission power component in the numerator of above-mentioned equation (1) is not a value averaged in the time domain, and is an instantaneous value. Further, in the instantaneous CQI used as the average reception SINR, a quantization error (deviation from the desired beam direction) is not considered. Therefore, when SLNR precoding is performed using an instantaneous CQI as the average reception SINR, it is not possible to generate accurate precoding weights.

SUMMARY OF THE INVENTION

The present invention was made in view of such a respect, and it is an object of the invention to provide a mobile terminal apparatus, radio base station apparatus and radio communication method that enable accurate precoding weights to be generated in coordinated multipoint (CoMP) transmission.

A mobile terminal apparatus of the invention is characterized by having a channel estimation section configured to perform channel estimation using a downlink reference signal, a PMI selecting section configured to select a PMI using a channel estimation value obtained in the channel estimation section, an IQI measuring section configured to measure an IQI (Interference Quality Indicator) using at least the channel estimation value and the PMI, and a transmission section configured to transmit at least the PMI and the IQI to a radio base station apparatus.

A radio base station apparatus of the invention is characterized by having a preceding weight generating section configured to generate preceding weights using a PMI and IQI transmitted from a mobile terminal apparatus as feedback, and a transmission section configured to perform coordinated multipoint transmission utilizing MIMO transmission using the precoding weights.

A radio communication method of the invention is characterized by having the steps in a mobile terminal apparatus of performing channel estimation using a downlink reference signal, selecting a PMI using the obtained channel estimation value, measuring an IQI using at least the channel estimation value and the PMI, and transmitting at least the PMI and the IQI to a radio base station apparatus, and the steps in the radio base station apparatus of generating precoding weights using the PMI and the IQI transmitted from the mobile terminal apparatus as feedback, and performing coordinated multipoint transmission utilizing MIMO transmission using the preceding weights. In addition, in the present invention, to calculate SLNR precoding, as well as the PMI, IQIs may be exchanged between radio base station apparatuses in a coordinated cluster (in a CoMP set).

According to the invention, the mobile terminal apparatus measures an IQI using at least a channel estimation value and PMI, and the radio base station apparatus generates precoding weights using the PMI and IQI, performs coordinated multipoint transmission utilizing MIMO transmission using the precoding weights, and therefore, in MIMO transmission of coordinated multipoint transmission, is capable of performing accurate SLNR precoding using, as an average reception SINR, the IQI with consideration given to average transmission power from each radio base station and instantaneous quantization error in the mobile terminal apparatus.

DESCRIPTION OF EMBODIMENTS

Figure 1:
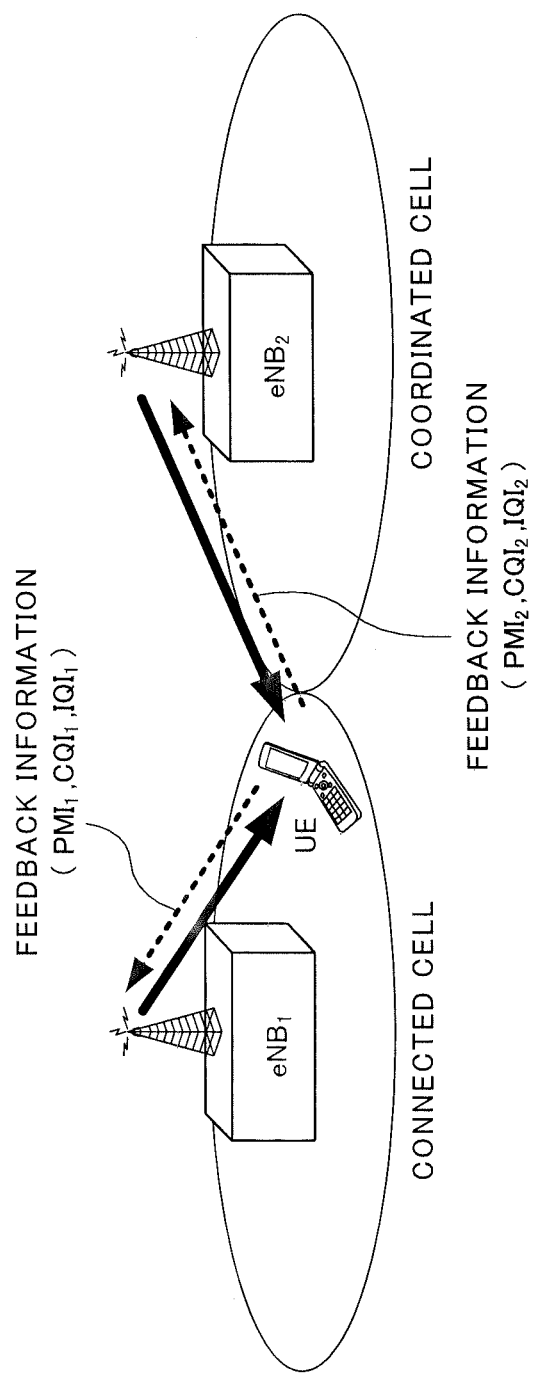
FIG. 1 is a diagram to explain CS/CB type CoMP.

Downlink CoMP transmission will be described first. As downlink CoMP transmission, there are Coordinated Scheduling/Coordinated Beamforming (CS/CB) and Joint processing. As shown in FIG. 1, Coordinated scheduling/Coordinated beamforming is a method in which only one cell transmits to one UE, and radio resources in the frequency/spatial domain are allocated with consideration given to interference from another cell and interference to another cell. Meanwhile, Joint processing is simultaneous transmission of a plurality of cells to which precoding is applied, and has Joint transmission in which a plurality of cells transmits to one UE, and Dynamic Cell Selection in which a cell is instantaneously selected.

MIMO techniques will be described next.

Figure 2:
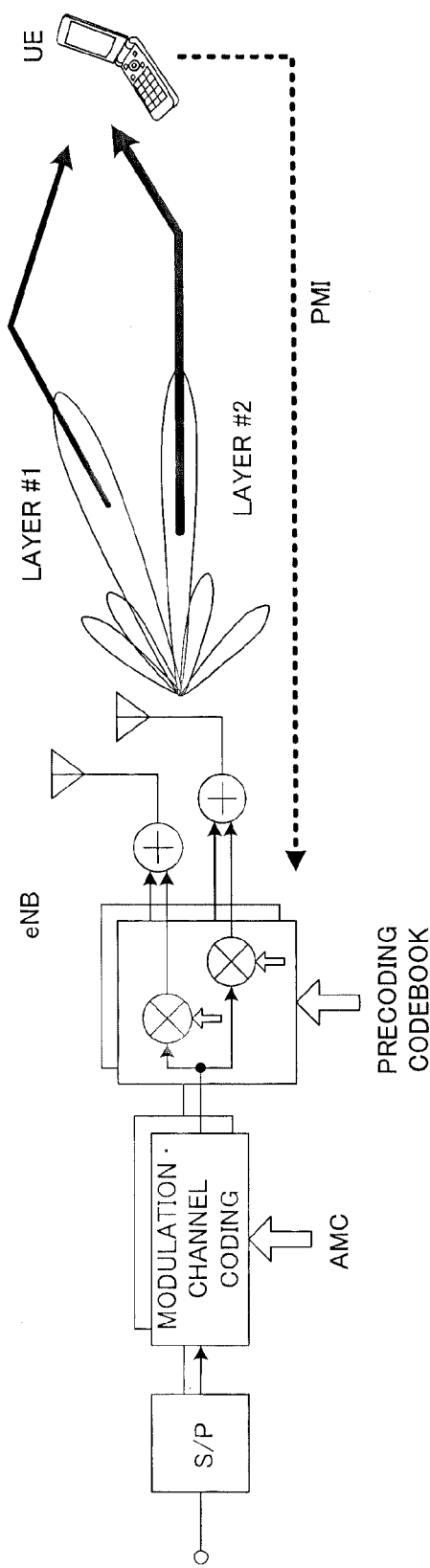
FIG. 2 is a diagram to explain MIMO transmission.

In precoding in downlink MIND transmission of a MIND system as shown in FIG. 2, a mobile terminal apparatus UE measures a channel coefficient using a reception signal from each antenna, and based on the measured channel coefficient, selects a PMI and RI (Rank Indicator), from a precoding codebook, corresponding to phase and amplitude control amounts (precoding weights) that maximize throughput subsequent to combining transmission data from respective transmission antennas of a radio base station apparatus eNB. Then, the UE transmits the selected PMI and RI to the radio base station apparatus eNB together with channel quality information CQI as feedback. The radio base station apparatus eNB performs channel coding and data modulation (AMC: Adaptive Modulation and Coding) on a transmission signal, and performs precoding on transmission data based on the PMI and RI transmitted from the mobile terminal apparatus (UE) as feedback. By this means, the phase and amplitude is respectively controlled (shifted) for each transmission antenna. Then, the eNB transmits the transmission data with the phase and amplitude shifted from each antenna.

In CS/CB type CoMP transmission, in performing SLNR precoding, when an instantaneous CQI is used as an average reception SINR, as described above, since the transmission power component of the numerator of above-mentioned equation (1) is not an average and instantaneous and a quantization error is not considered in an instantaneous CQI, it is not possible to generate accurate precoding weights.

Therefore, the inventors of the present invention found out that it is possible to generate accurate precoding weights by defining new feedback information that includes an average transmission power component and that corrects a quantization error, and performing SLNR precoding using the feedback information, and arrived at the invention.

In other words, it is the gist of the invention measuring an IQI using at least a channel estimation value and PMI, generating precoding weights using the PMI and IQI, performing coordinated multipoint transmission utilizing MIMO transmission using the precoding weights, and in MIMO transmission of coordinated multipoint transmission, thereby performing accurate SLNR precoding using the IQI with consideration given to the average transmission power from each radio base station and the quantization error on the mobile terminal apparatus side.

In the invention, to generate accurate precoding weights, a new interference quality indicator (IQI: Interference Quality Indicator) is defined in SLNR precoding. Accordingly, in the invention, in downlink coordinated multipoint transmission, a mobile terminal apparatus transmits the IQI to a radio base station apparatus as feedback in addition to the PMI and CQI as feedback information.

The IQI is calculated as described in following equation (3). Further, a reception signal $y_i$ in a mobile terminal apparatus is calculated from a desired signal component and an interference signal component including a quantization error and noise as described in following equation (4).

$$IQI_i^j = \frac{P_j}{ICI_i + N_i + QE_{i,j}}, \quad \text{Eq. (3)}$$

$$\forall i, j \in \text{In CoMP SET}$$

$P_j$: Average transmission power of a radio base station apparatus j $QE_{i,j}$: Quantization error of a channel between the radio base station apparatus j and a mobile terminal apparatus i in the mobile terminal apparatus i $ICI_i$: Interference except interference from a cell belonging to a CoMP set in the mobile terminal apparatus i $N_i$: Average noise in a receiver in the mobile terminal apparatus i $$y_i = H_i^j s_j + n_i = \underbrace{(F_i^j)^H s_j}_{\substack{\text{DESIRED} \\ \text{SIGNAL} \\ \text{COMPONENT}}} + \underbrace{\left(H_i^j - (F_i^j)^H\right) s_j + ICI_i + n_i}_{\substack{\text{INTERFERENCE SIGNAL} \\ \text{COMPONENT INCLUDING} \\ \text{QUANTIZATION ERROR} \\ \text{AND NOISE}}} \quad \text{Eq. (4)}$$

$H_i^j$: Downlink channel state $F_i^j$: PMI feedback from the mobile terminal apparatus i In the invention, the IQI that is specific feedback information is defined in five aspects.

(Aspect 1)

In this Aspect, the IQI is defined by following equation (5).

$$IQI_i^j = \frac{P_{avg,j}}{ICI_i + N_i + P_{avg,j} \times \left\| H_i^j - (F_i^j)^H \right\|^2}, \quad \forall i, j \quad \text{Eq. (5)}$$

$P_{avg,j}$: Average total transmission power of the radio base station apparatus j In above-mentioned equation (5), the numerator $P_{avg,j}$ represents average transmission power, $ICI_i + N_i$ represents interference+average noise from another cell (cell except the CoMP set) on the mobile terminal apparatus side, and $P_{avg,j} \times \left\| H_i^j - (F_i^j)^H \right\|^2$ represents a quantization error.

Thus, the calculation equation of the IQI includes the terms of average transmission power from each radio base station and the quantization error on the mobile terminal apparatus side, and therefore, the IQI is a parameter considering both. The radio base station apparatus performs SLNR precoding using the IQI, and is thereby capable of generating accurate precoding weights.

In addition, in above-mentioned equation (5), instead of $H_i^j$, normalized $H_i^j$ may be used which is normalized by norm as in following equation (6).

$$\overline{H}_i^j = \frac{H_i^j}{\left\| H_i^j \right\|} \quad \text{Eq. (6)}$$

Further, for the IQI, instead of above-mentioned equation (5), following equation (7) may be used. In addition, $F_i^j$ is a vector of norm 1 as shown in following equation (8).

$$IQI_i^j = \frac{P_{avg,j}}{ICI_i + N_i + P_{avg,j} \times \left\| H_i^j F_i^j - I \right\|^2}, \quad \forall i, j \quad \text{Eq. (7)}$$

In addition, descriptions of the same parameters as in the above-mentioned equations are the same, and are omitted.

$$F_i^j (F_i^j)^H = I \quad \text{Eq. (8)}$$

In this Aspect, the definitions of the IQI are not limited to above-mentioned equations (5) and (7), and it is possible to apply all substantially equivalent equations by conversion of the equation and the like.

(Aspect 2)

In this Aspect, the IQI is defined by following equation (9). In this Aspect, the IQI for the connected cell (serving cell) (eNB$_1$ in FIG. 1) and the IQI for the coordinated cell (eNB$_2$ in FIG. 1) are defined independently. In other words, in calculation of the IQI, for the connected cell, the quantization error is regarded as being small, and is not considered in the IQI calculation equation of the connected cell, and the quantization error is considered only for the coordinated cell.

$$IQI_i^j = \frac{P_{avg,i}}{ICI_i + N_i} \quad i = j \quad \text{Eq. (9)}$$

$$IQI_i^j = \frac{P_{avg,j}}{ICI_i + N_i + P_{avg,j} \times \left\| H_i^j - (F_i^j)^H \right\|^2} \quad j \neq i$$

In addition, descriptions of the same parameters as in the above-mentioned equations are the same, and are omitted.

Thus, the calculation equation of the IQI includes the terms of average transmission power from each radio base station and the quantization error on the mobile terminal apparatus side, and therefore, the IQI is a parameter considering both. The radio base station apparatus performs SLNR precoding using the IQI, and is thereby capable of generating accurate precoding weights. In this case, since the quantization error is not considered for the connected cell, it is possible to reduce the IQI calculation amount. In addition, in this Aspect, the definitions of the IQI are not limited to above-mentioned equation (9), and it is possible to apply all substantially equivalent equations by conversion of the equation and the like.

(Aspect 3)

In this Aspect, the IQI is defined by following equation (10). Also in this Aspect, the IQI for the connected cell (serving cell) (eNB$_1$ in FIG. 1) and the IQI for the coordinated cell (eNB$_2$ in FIG. 1) are defined independently. In other words, in calculation of the IQI, in considering the quantization error, for the connected cell, since the quantization error is small, a weight of the quantization error is reduced. More specifically, for the connected cell, used is a maximum value of the eigenvalue by eigen decomposition of the channel matrix $H_i^i$.

$$IQI_i^j = \frac{P_{avg,i}}{ICI_i + N_i + P_{avg,i} \times \|H_i^i - \lambda_{i,max}^i (F_i^i)^H\|^2} \quad i = j \quad \text{Eq. (10)}$$

$$IQI_i^j = \frac{P_{avg,i}}{ICI_i + N_i + P_{avg,j} \times \|H_i^j - (F_i^j)^H\|^2} \quad j \neq i$$

$$\lambda_{i,max}^i = \max eigenvalue(H_i^i)$$

In addition, descriptions of the same parameters as in the above-mentioned equations are the same, and are omitted.

(Aspect 4)

In this Aspect, in calculation of the IQI, in considering the quantization error as defined in following equation (11), weights of the quantization error are reduced for the connected cell and coordinated cell. More specifically, the maximum value of the eigenvalue by eigen decomposition is used for the connected cell and coordinated cell.

$$IQI_i^j = \frac{P_{avg,j}}{ICI_i + N_i + P_{avg,j} \times \|H_i^j - \lambda_{i,max}^j (F_i^j)^H\|^2} \quad \text{Eq. (11)}$$

$$\lambda_{i,max}^j = \max eigenvalue(H_i^j)$$

In addition, descriptions of the same parameters as in the above-mentioned equations are the same, and are omitted.

(Aspect 5)

In this Aspect, an instantaneous quantization error is not considered for all of the connected cell and coordinated cell.

$$IQI_i^j = \frac{P_{avg,j}}{ICI_i + N_i}, \forall i, j \quad \text{Eq. (12)}$$

Thus, the calculation equation of the IQI includes the terms of average transmission power and the quantization error on the mobile terminal apparatus side, and therefore, the IQI is a parameter considering both. The radio base station apparatus performs SLNR precoding using the IQI, and is thereby capable of generating accurate precoding weights. In this case, since the quantization error is calculated by varying weights for the connected cell and coordinated cell, it is possible to calculate the quantization error more accurately. In addition, in this Aspect, the definition of the IQI is not limited to above-mentioned equation (10), and it is possible to apply all substantially equivalent equations by conversion of the equation and the like.

As an IQI feedback method, the mobile terminal apparatus may calculate an IQI using a downlink reference signal, and transmit the calculated IQI to the radio base station apparatus in uplink (first feedback method). Alternatively, the mobile terminal apparatus may obtain a part of a value (value capable of being calculated only in the mobile terminal apparatus) required for calculation of an IQI (calculation value of the denominator in above-mentioned equation (5), (7), (9), (10), or (11): $IQI_{i,UE}^j$) and transmit the obtained calculation value to the radio base station apparatus in uplink, and the radio base station apparatus may calculate the IQI using the calculation value (second feedback method). By adopting such a latter feedback method, it is possible to reduce the feedback information amount.

In such a latter feedback method, for example, in Aspect 1, the calculation value $IQI_{i,UE}^j$ that the mobile terminal apparatus transmits as feedback is a value shown in following equation (13). The mobile terminal apparatus transmits this calculation value $IQI_{i,UE}^j$ to the radio base station apparatus. The radio base station apparatus knows average total transmission power ($P_{avg,j}$) of the radio base station apparatus j (by information exchange between radio base station apparatuses in the cluster, or the like), and therefore, obtains $IQI_{i,eNB}^j = IQI_i^j$ using this parameter (following equation (14)).

$$IQI_{i,UE}^j = ICI_i + N_i + P_{avg,j} \times \|H_i^j - (F_i^j)^H\|^2, \forall i, j \quad \text{Eq. (13)}$$

$$IQI_i^j = IQI_{i,eNB}^j = \frac{P_{avg,j}}{IQI_{i,UE}^j}, \forall i, j \quad \text{Eq. (14)}$$

Similarly, in Aspect 2, the calculation value $IQI_{i,UE}^j$ that the mobile terminal apparatus transmits as feedback is a value calculated in the denominator of above-mentioned equation (9). The mobile terminal apparatus transmits this calculation value $IQI_{i,UE}^j$ (connected cell and coordinated cell) to the radio base station apparatus. The radio base station apparatus i knows average total transmission power ($P_{avg,j}$) of the radio base station apparatus j, and therefore, obtains $IQI_{i,eNB}^j = IQI_i^j$ using this parameter. Further, similarly, in Aspect 3, the calculation value $IQI_{i,UE}^j$ that the mobile terminal apparatus transmits as feedback is a value calculated in the denominator of above-mentioned equation (10). The mobile terminal apparatus transmits this calculation value $IQI_{i,UE}^j$ (connected cell and coordinated cell) to the radio base station apparatus. The radio base station apparatus i knows average total transmission power ($P_{avg,j}$) of the radio base station apparatus j, and therefore, obtains $IQI_{i,eNB}^j = IQI_i^j$ using this parameter.

In above-mentioned Aspects 1 to 5, an instantaneous value is used in calculation of the IQI with the quantization error considered. In the case of generating precoding weights using the IQI, it is desirable to time-average the IQI value so as to further improve accuracy. More specifically, as shown in following equation (15), the mobile terminal apparatus obtains an average value (time average value) of the IQI at time T+1, using an average value of the IQI at time T and IQI instantaneous value at time T+1, and transmits the time average value to the radio base station apparatus as feedback.

$$IQI_i^j = (IQI_{i,avg}^j)_{T+1} = \frac{T+1}{\frac{T}{(IQI_{i,avg}^j)} + \frac{1}{IQI_{i,T+1}^j}} \quad \text{Eq. (15)}$$

$(IQI_i^j)_{T+1}$: Instantaneous value of IQI in a subframe (T+1)
$(IQI_{i,avg}^j)_{T+1}$: Average value of IQI in a subframe (T+1)
T+1: Length of the averaging time window For time-averaging of the IQI, the mobile terminal apparatus side may perform, or the radio base station apparatus side may perform. In other words, the mobile terminal apparatus may obtain an IQI instantaneous value, and transmit this IQI instantaneous value to the radio base station apparatus as feedback, and the radio base station apparatus may time-average the IQI as shown in above-mentioned equation (15). In addition, generally, a time average interval of the IQI is longer than a time average interval of the CQI.

Further, as shown in following equation (16), averaging may be performed by providing the IQI instantaneous value at time T+1 and IQI average value at time T with weights. In this case, when the weight of the instantaneous value is made higher than that of the average value, the weight of the IQI instantaneous value at time T+1 is increased. When the weight of the average value is made higher than that of the instantaneous value, the weight of the IQI average value at time T is increased. By this means, it is possible to vary a value of α and adjust weighing on the instantaneous value and average value.

$$IQI_i^j = (IQI_{i,avg}^j)_{T+1} = \frac{1}{\frac{(1-\alpha)}{(IQI_{i,avg}^j)_T} + \frac{\alpha}{IQI_{i,T+1}^j}} \quad 0 < \alpha \le 1 \qquad \text{Eq. (16)}$$

Thus, by time-averaging the IQI, it is possible to improve IQI calculation accuracy, and improve accuracy of SLNR precoding weights.

An Embodiment of the present invention will specifically be described below with reference to accompanying drawings. Described herein is the case of using the radio base station apparatus and mobile terminal apparatus that support the LTE-A system.

Figure 3:
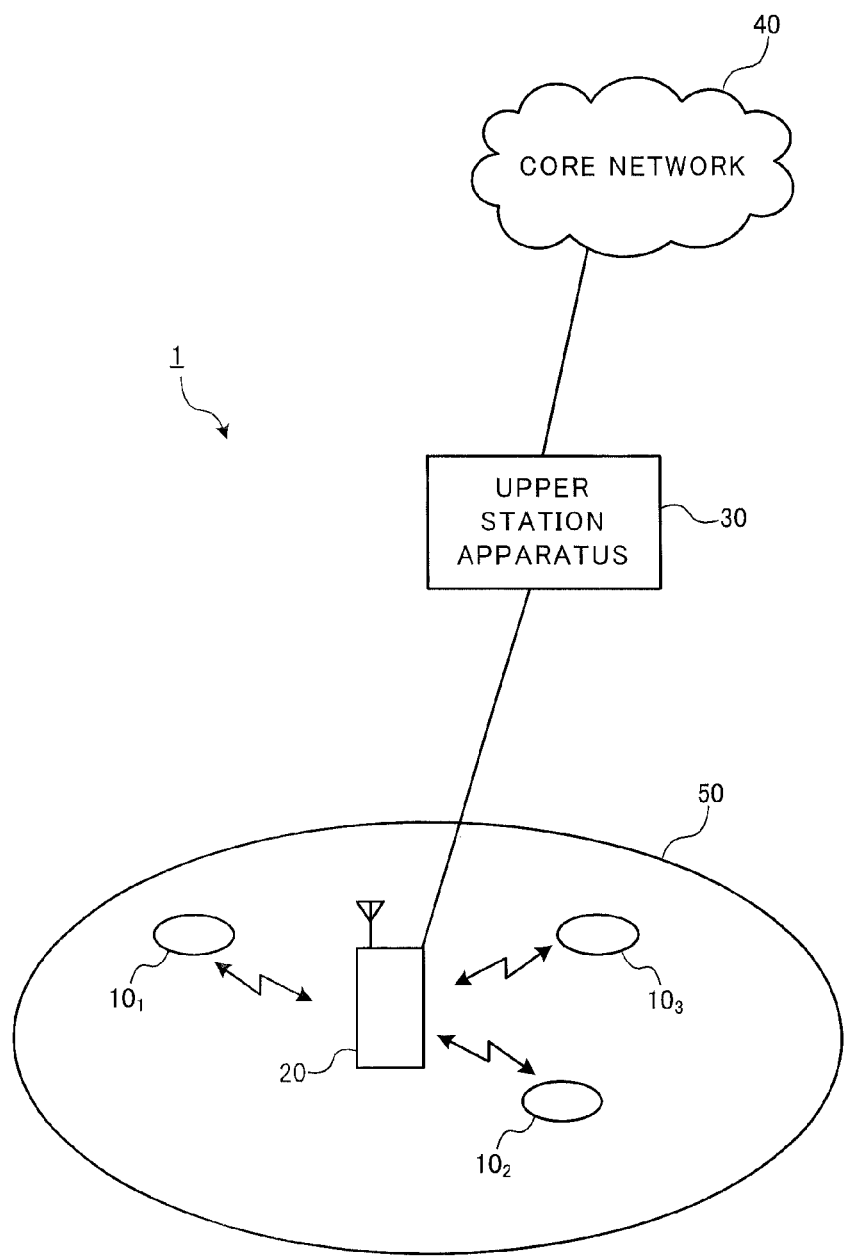
FIG. 3 is a diagram to explain a configuration of a mobile communication system according to one Embodiment of the invention.

Referring to FIG. 3, described is a mobile communication system 1 having mobile terminal apparatuses (UEs: User Equipments) 10 and radio base station apparatus (eNode B) 20 according to one Embodiment of the invention. FIG. 3 is a diagram to explain a configuration of the mobile communication system 1 having mobile terminal apparatuses 10 and radio base station apparatus 20 according to the Embodiment of the invention. In addition, for example, the mobile communication system 1 as shown in FIG. 3 is a system including the LTE system or Super 3G. Further, the mobile communication system 1 may be called IMT-Advanced or may be called 4G.

As shown in FIG. 3, the mobile communication system 1 includes the radio base station apparatus 20 and a plurality of mobile terminal apparatuses 10 (10$_1$, 10$_2$, 10$_3$, ... 10$_n$, n is an integer where n☐0) that communicate with the radio base station apparatus 20, and is comprised thereof. The radio base station apparatus 20 is connected to an upper station apparatus 30, and the upper station apparatus 30 is connected to a core network 40. The mobile terminal apparatuses 10 communicate with the radio base station apparatus 20 in a cell 50. In addition, for example, the upper station apparatus 30 includes an access gateway apparatus, Radio Network Controller (RNC), Mobility Management Entity (MME) and the like, but is not limited thereto.

Each of the mobile terminal apparatuses (10$_1$, 10$_2$, 10$_3$, ... 10$_n$) has the same configuration, function and state, and is described as a mobile terminal apparatus 10 unless otherwise specified in the following description. Further, for convenience in description, the description is given while assuming that equipment which performs radio communications with the radio base station apparatus 20 is the mobile terminal apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH shared among the mobile terminal apparatuses 10, and downlink L1/L2 control channels (PDCCH, PCFICH, PHICH). User data i.e. normal data signals are transmitted on the PDSCH. The transmission data is included in the user data. In addition, a CC assigned to the mobile terminal apparatus 10 in the radio base station apparatus 20 and scheduling information is notified to the mobile terminal apparatus 10 on the L1/L2 control channel.

In uplink, used are the PUSCH (Physical Uplink Shared Channel) shared among the mobile terminal apparatuses 10, and the PUCCH (Physical Uplink Control Channel) that is a control channel in uplink. User data is transmitted on the PUSCH. Meanwhile, radio quality information (CQI: Channel Quality Indicator) in downlink and the like are transmitted on the PUCCH.

Figure 4:
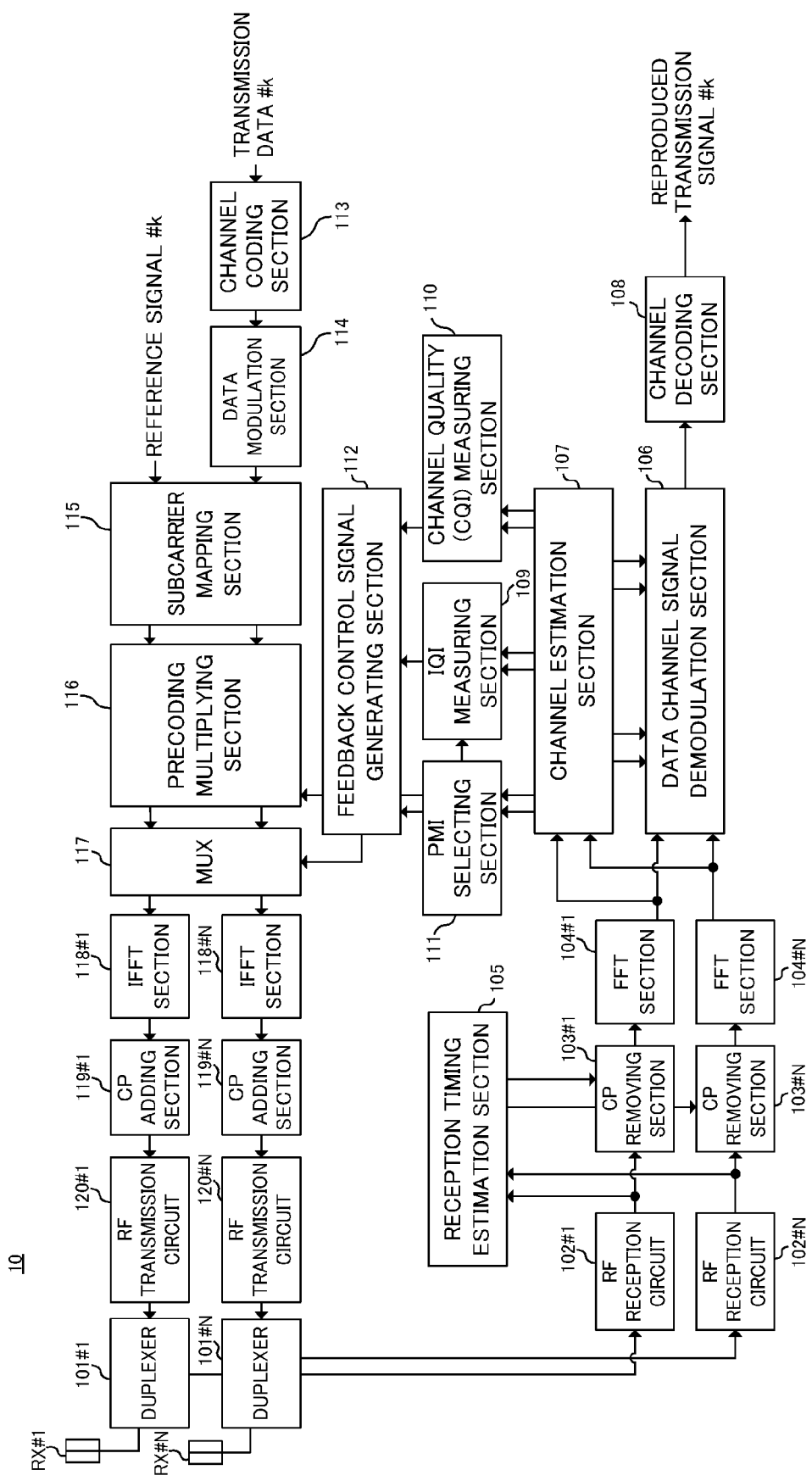
FIG. 4 is a block diagram illustrating a configuration of a mobile terminal apparatus according to the above-mentioned Embodiment.
Figure 5:
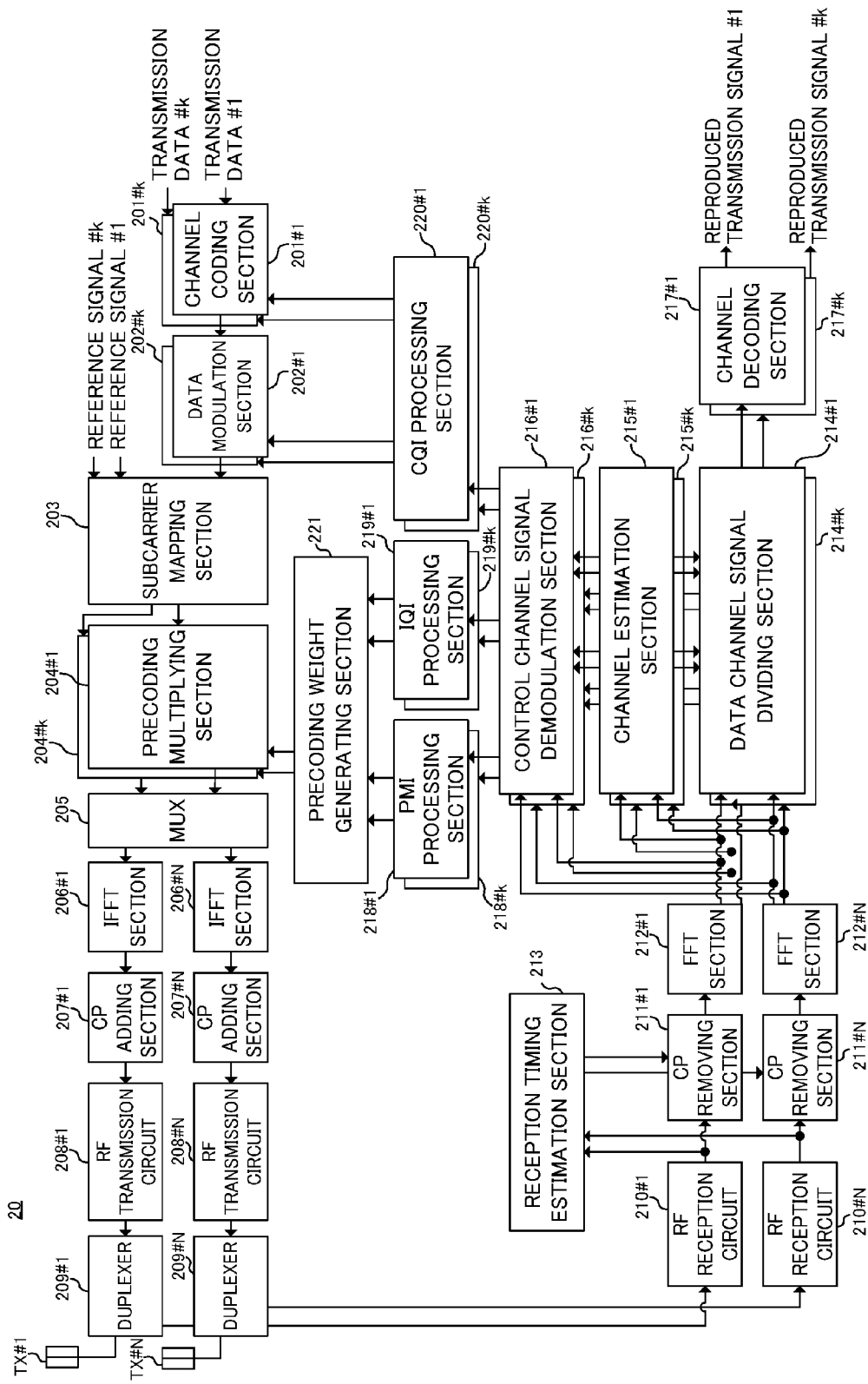
FIG. 5 is a block diagram illustrating a configuration of a radio base station apparatus according to the above-mentioned Embodiment.

FIG. 4 is a block diagram illustrating a configuration of the mobile terminal apparatus 10 according to this Embodiment. FIG. 5 is a block diagram illustrating a configuration of the radio base station apparatus 20 according to this Embodiment. In addition, the configurations of the mobile terminal apparatus 10 and the radio base station apparatus 20 as shown in FIGS. 4 and 5 are simplified to explain the present invention, and are assumed to have the configurations that a normal mobile terminal apparatus and radio base station apparatus have, respectively.

In the mobile terminal apparatus 10 as shown in FIG. 4, transmission signals transmitted from the radio base station apparatus 20 are received in reception antennas RX#1 to RX#N, electrically divided into transmission paths and reception paths in duplexers 101#1 to 101#N, and then, output to RF reception circuits 102#1 to 102#N. Then, the signals undergo frequency conversion processing for converting a radio-frequency signal into a baseband signal in the RF reception circuits 102#1 to 102#N. CPs are removed from the baseband signals subjected to the frequency conversion processing in cyclic prefix (CP) removing sections 103#1 to 103#N, and the resultants are output to Fast Fourier Transform sections (FFT sections) 104#1 to 104#N. A reception timing estimation section 105 estimates reception timing from reference signals included in the reception signals, and notifies the CP removing sections 103#1 to 103#N of the estimation result. The FFT sections 104#1 to 104#N perform Fourier transform on the input reception signals, and transform the time-series signals into signals in the frequency domain. The reception signals transformed into the signals in the frequency domain are output to a data channel signal demodulation section 106.

The data channel signal demodulation section 106 divides the reception signals input from the FFT sections 104#1 to 104#N, for example, by Minimum Mean Square Error (MMSE) or Maximum Likelihood Detection (MLD) signal division method. By this means, the reception signals coming from the radio base station apparatus 20 are divided into reception signals concerning users #1 to #k, and a reception signal concerning a user (herein, assumed to be a user k) of the mobile terminal apparatus 10 is extracted. A channel estimation section 107 estimates channel states from the reference signals included in the reception signals output from the FFT sections 104#1 to 104#N, and notifies the estimated channel states to the data channel signal demodulation section 106, and a channel quality measuring section 110 and PMI selecting section 111, described later. The data channel signal demodulation section 106 divides the reception signals by the above-mentioned MLD signal division method based on the notified channel states. By this means, the reception signal concerning the user k is demodulated.

In addition, it is assumed that the extracted reception signal concerning the user k is demapped in a subcarrier demapping section, not shown, and is restored to the time-series signal prior to the demodulation processing in the data channel signal demodulation section 106. The reception signal concerning the user k demodulated in the data channel signal demodulation section 106 is output to a channel decoding section 108. Then, the channel decoding section 108 performs channel decoding processing, and a transmission signal #k is thus reproduced.

An IQI measuring section 109 measures an IQI using at least the channel states (channel estimation values) notified from the channel estimation section 107 and the PMI selected in the PMI selecting section 111, described later. In other words, the IQI measuring section 109 obtains the IQI by the above-mentioned equations, using at least average transmission power of each radio base station apparatus and the quantization error on the mobile terminal apparatus side. For example, in Aspect 1, the section 109 calculates the IQI Of the connected cell and the IQI of the coordinated cell by above-mentioned equation (5) or (7). Further, in Aspect 2, the section 109 calculates the IQI Of the connected cell and the IQI of the coordinated cell by above-mentioned equation (9). In Aspect 3, the section 109 calculates the IQI Of the connected cell and the IQI of the coordinated cell by above-mentioned equation (10). In Aspect 4, the section 109 calculates the IQI Of the connected cell and the IQI of the coordinated cell by above-mentioned equation (11).

In the above-mentioned first feedback method, the IQI measuring section 109 calculates the IQI by above-mentioned equation (5), (7), (9), (10) or (11) using at least the channel states and PMI. In the above-mentioned second feedback method, the section 109 calculates the calculation value ($IQI_{i,UE}^j$) of the denominator of above-mentioned equation (5), (7), (9), (10) or (11) using at least the channel states and PMI. The IQI measuring section 109 outputs the calculated IQI or $IQI_{i,UE}^j$ to a feedback control signal generating section 112. Further, when necessary, the IQI measuring section 109 time-averages the IQI by above-mentioned equations (15) and (16).

The channel quality measuring section 110 measures channel quality (CQI) based on the channel states notified from the channel estimation section 107. Then, the section 110 outputs the CQI that is a measurement result to a feedback control signal generating section 112. The PMI selecting section 111 selects a PMI based on the channel states notified from the channel estimation section 107. Then, the section 111 outputs the selected PMI to the feedback control signal generating section 112.

Using the IQI or $IQI_{i,UE}^j$ from the IQI measuring section 109, the CQI from the channel quality measuring section 110 and the PMI from the PMI selecting section 111, the feedback control signal generating section 112 generates a control signal (for example, PUCCH) to transmit the indicators to the radio base station apparatus 20 as feedback. The control signal generated in the feedback control signal generating section 112 is output to a multiplexer (MUX) 117.

Transmission data #k concerning the user #k output from a higher layer is subjected to channel coding in a channel coding section 113, and is subjected to data modulation in a data modulation section 114. The transmission data #k subjected to data modulation in the data modulation section 114 is transformed from the time-series signal into the signal in the frequency domain in a serial/parallel transform section, not shown, and is output to a subcarrier mapping section 115.

The subcarrier mapping section 115 maps the transmission data #k to subcarriers corresponding to scheduling information indicated from the radio base station apparatus 20. At this point, the subcarrier mapping section 115 maps (multiplexes) a reference signal #k generated in a reference signal generating section, not shown, to the subcarriers together with the transmission data #k. The transmission data #k thus mapped to the subcarriers is output to a precoding multiplying section 116.

The precoding multiplying section 107 shifts the phase and/or amplitude of the transmission data #k for each of the reception antennas RX#1 to RX#N based on the precoding weights obtained from the PMI selected in the PMI selecting section 111. The transmission data #k with the phase and/or amplitude shifted in the precoding multiplying section 116 is output to the multiplexer (MUX) 117.

The multiplexer (MUX) 117 combines the transmission data #k with the phase and/or amplitude shifted and the control signal generated in the feedback control signal generating section 112, and generates transmission signals for each of the reception antennas RX#1 to RX#N. The transmission signals generated in the multiplexer (MUX) 117 are subjected to inverse fast Fourier transform in inverse fast Fourier transform sections 118#1 to 118#N, transformed from the signals in the frequency domain into the signals in the time domain, then provided with CPs in CP adding sections 119#1 to 119#N, and output to RF transmission circuits 120#1 to 120#N. Then, the RF transmission circuits 120#1 to 120#N perform frequency conversion processing for converting into the radio frequency band on the signals to output to the reception antennas RX#1 to RX#N via the duplexers 101#1 to 101#N, and the signals are transmitted from the reception antennas RX#1 to RX#N to the radio base station apparatus 20 in uplink.

In the radio base station apparatus 20 as shown in FIG. 5, a scheduler, not shown, determines the number of users (the number of multiplexed users) to multiplex based on channel estimation values provided from channel estimation sections 215#1 to 215#k, described later. Then, the scheduler determines the resource allocation content (scheduling information) of uplink and downlink to each user, and outputs transmission data #1 to #k to users #1 to #k to corresponding channel coding sections 201#1 to 201#k.

The transmission data #1 to #k is subjected to channel coding in the channel coding sections 201#1 to 201#k, then output to data modulation sections 202#1 to 202#k, and is subjected to data modulation. At this point, channel coding and data modulation is performed based on the channel coding rate and modulation scheme provided from CQI processing sections 220#1 to 220#k, described later. The transmission data #1 to #k subjected to data modulation in the data modulation sections 202#1 to 202#k is subjected to inverse Fourier transform in a discrete Fourier transform section, not shown, is transformed from the time-series signal into a signal in the frequency domain, and is output to a subcarrier mapping section 203.

The subcarrier mapping section 203 maps the transmission data #1 to #k to subcarriers corresponding to scheduling information provided from the scheduler. At this point, the subcarrier mapping section 203 maps (multiplexes) reference signals #1 to #k input from a reference signal generating section, not shown, to the subcarriers together with the transmission data #1 to #k. The transmission data #1 to #k thus mapped to the subcarriers is output to precoding multiplying sections 204#1 to 204#k.

The precoding multiplying sections 204#1 to 204#k shift the phases and/or amplitude of the transmission data #1 to #k for each of transmission antennas TX#1 to TX#N based on the precoding weights provided from a precoding weight generating section 221, described later, (weighting of the transmission antennas TX#1 to TX#N by precoding). The transmission data #1 to #k with the phases and/or amplitude shifted in the precoding multiplying sections 204#1 to 204#k is output to a multiplexer (MUX) 205.

The multiplexer (MUX) 205 combines the transmission data #1 to #k with the phases and/or amplitude shifted, and generates transmission signals for each of the transmission antennas TX#1 to TX#N. The transmission signals generated in the multiplexer (MUX) 205 are subjected to inverse fast Fourier transform in inverse fast Fourier transform sections 206#1 to 206#N, and are transformed from the signals in the frequency domain into the signals in the time domain. Then, the signals are provided with CPs in cyclic prefix (CP) adding sections 207#1 to 207#N, and are output to RF transmission circuits 208#1 to 208#N. Then, the RF transmission circuits 208#1 to 208#N perform frequency conversion processing for converting into the radio frequency band on the signals to output to the transmission antennas TX#1 to TX#N via the duplexers 209#1 to 209#N, and the signals are transmitted from the transmission antennas TX#1 to TX#N to the mobile station apparatuses 10 in downlink.

Meanwhile, transmission signals transmitted from the mobile station apparatuses 10 in uplink are received in the transmission antennas TX#1 to TX#N, electrically divided into transmission paths and reception paths in the duplexers 209#1 to 209#N, and then, output to RF reception circuits 210#1 to 210#N. Then, the signals undergo frequency conversion processing for converting a radio-frequency signal into a baseband signal in the RF reception circuits 210#1 to 210#N. CPs are removed from the baseband signals subjected to the frequency conversion processing in CP removing sections 211#1 to 211#N, and the resultants are output to Fast Fourier Transform sections (FFT sections) 212#1 to 212#N. A reception timing estimation section 213 estimates reception timing from reference signals included in the reception signals, and notifies the CP removing sections 211#1 to 211#N of the estimation result. The FFT sections 212#1 to 212#N perform Fourier transform on the input reception signals, and transform the time-series signals into signals in the frequency domain. The reception signals transformed into the signals in the frequency domain are output to data channel signal dividing sections 214#1 to 214#k.

The data channel signal dividing sections 214#1 to 214#k divide the reception signals input from the FFT sections 212#1 to 212#k, for example, by Minimum Mean Square Error (MMSE) or Maximum Likelihood Detection (MLD) signal division method. By this means, the reception signals coming from the mobile station apparatuses 10 are divided into reception signals concerning users #1 to #k. The channel estimation sections 215#1 to 215#k estimate channel states from reference signals included in the reception signals output from the FFT sections 212#1 to 212#k, and notify the estimated channel states to the data channel signal dividing sections 214#1 to 214#k, and control channel signal demodulation sections 216#1 to 216#k. The data channel signal dividing sections 214#1 to 214#k divide the reception signals by the above-mentioned MLD signal division method based on the notified channel states.

The reception signals concerning the users #1 to #k divided in the data channel signal dividing sections 214#1 to 214#k are demapped in subcarrier demapping sections, not shown, restored to the time-series signals, and then, are subjected to data demodulation in data demodulation sections, not shown. Then, channel decoding sections 217#1 to 217#k perform channel decoding processing, and transmission signals #1 to #k are thus reproduced.

The control channel signal demodulation sections 216#1 to 216#k demodulate control channel signals (for example, PDCCHs) included in the reception signals input from the FFT sections 212#1 to 212#k. At this point, the control channel signal demodulation sections 216#1 to 216#k demodulate control channel signals respectively associated with the users #1 to #k. At this point, the control channel signal demodulation sections 216#1 to 216#k demodulate the control channel signals based on the channel states notified from the channel estimation sections 215#1 to 215#k. The control channel signals demodulated in the control channel signal demodulation sections 216#1 to 216#k are output to PMI processing sections 218#1 to 218#k, IQI processing sections 219#1 to 219#k, and CQI processing sections 219#1 to 219#k, respectively.

The PMI processing sections 218#1 to 218#k extract PMIs from the information included in respective control channel signals (for example, PUCCHs) input from the control channel signal demodulation sections 216#1 to 216#k. The PMIs reproduced in the PMI processing sections 218#1 to 218#k are output to a precoding weight generating section 221.

The IQI processing sections 219#1 to 219#k extract the IQIs or $IQI_{i,UE}^{j}$ from the information included in respective control channel signals (for example, PUCCHs) input from the control channel signal demodulation sections 216#1 to 216#k. Further, in the above-mentioned first feedback information, each of the IQI processing sections 219#1 to 219#k outputs the extracted IQI to the precoding weight generating section 221. In the above-mentioned second feedback information, each of the IQI processing sections 219#1 to 219#k obtains the IQI using information (parameters included in above-mentioned equations (5), (7), (9), (10) and (11)) necessary for IQI measurement including at least the channel estimation value and PMI from the mobile terminal apparatus (UE). In other words, each of the IQI processing sections 219#1 to 219#k calculates the IQI using extracted $IQI_{i,UE}^{j}$ by above-mentioned equation (5), (7), (9), (10) or (11), and outputs the IQI to the precoding weight generating section 221.

In the latter case, for example, in Aspect 1, each of the IQI processing sections 219#1 to 219#k calculates the IQI of the connected cell and the IQI of the coordinated cell by above-mentioned equation (5) or (7). Further, in Aspect 2, each section calculates the IQI of the connected cell and the IQI of the coordinated cell by above-mentioned equation (9). In Aspect 3, each section calculates the IQI of the connected cell and the IQI of the coordinated cell by above-mentioned equation (10). Further, when necessary, each of the IQI processing sections 219#1 to 219#k time-averages the IQI by above-mentioned equation (15) or (16).

The CQI processing sections 220#1 to 220#k measure CQIs from the reference signals included in respective control channel signals (for example, PUCCHs) input from the control channel signal demodulation sections 216#1 to 216#k, while always updating the CQI information to the latest state. The CQI information updated in the CQI processing sections 219#1 to 219#k is output to the channel coding sections 201#1 to 201#k and data modulation sections 202#1 to 202#k, respectively.

The precoding weight generating section 221 generates precoding weights indicative of the phase and/or amplitude shift amounts for the transmission data #1 to #k, using the PMIs input from the PMI processing sections 218#1 to 218#k, and the IQIs input from the IQI processing sections 219#1 to 219#k. The generated precoding weights are output to the precoding multiplying sections 204#1 to 204#k, and used in precoding of the transmission data #1 to #k.

The precoding weight generating section 220 generates precoding weights as described below. First, as shown in following equation (17), the section 220 makes the PMIs channel coefficients (in the case based on the premise that the number of radio base station apparatuses in the coordinated cluster is "3" and that the number of reception antennas on the mobile terminal side is "2").

$$\hat{H}_i^1 = (F_i^1)^H, \hat{H}_i^2 = (F_i^2)^H, \hat{H}_i^3 = (F_i^3)^H \qquad \text{Eq. (17)}$$

Next, from the channel coefficients and IQIs obtained in equation (17), the section 220 obtains channel covariance matrixes of the connected cell (eNB$_1$ in FIG. 1) and coordinated cell (eNB$_2$ in FIG. 1) by following equation (18).
(Serving cell)

$$\hat{R}_i = \hat{H}_i^i \times [^{IQI_i^i}{}_{IQI_i^i}] \times (\hat{H}_i^i)^H$$

(Coordinating cell)

$$\hat{R}_j = \hat{H}_j^i \times [^{IQI_i^j}{}_{IQI_i^j}] \times (\hat{H}_j^i)^H \hat{R}_k = \hat{H}_k^i \times [^{IQI_i^j}{}_{IQI_i^j}] \times (\hat{H}_k^i)^H \qquad \text{Eq. (18)}$$

Subsequently, the section 220 obtains precoding weights in SLNR precoding from the channel covariance matrixes of the connected cell and coordinated cell by following equation (19).

$$P_i = \text{max eigenvector}[(I + \hat{R}_j + \hat{R}_k)^{-1} \hat{R}_i] \qquad \text{Eq. (19)}$$

(First Feedback Method)

In the mobile communication system having the above-mentioned configuration, in the mobile terminal apparatus (UE), the channel estimation section 107 performs channel estimation using downlink reference signals. Then, the PMI selecting section 111 selects the PMI using the channel estimation values obtained in the channel estimation section 107. Next, the IQI measuring section 109 measures the IQI using at least the channel estimation values and PMI. At this point, the IQI measuring section 109 calculates the IQI by equation (5), (7), (9), (10) or (11) according to any one of above-mentioned Aspects 1 to 3. The IQI is transmitted to the radio base station apparatus eNB as feedback.

In the radio base station apparatus eNB, the precoding weight generating section 221 generates precoding weights using the PMIs and IQIs transmitted as feedback. At this point, the precoding weight generating section 221 generates precoding weights by above-mentioned equations (17) to (19). Next, the radio base station apparatus eNB performs coordinated multipoint transmission utilizing MIMO transmission, using the obtained precoding weights.
(Second Feedback Method)

In the mobile communication system having the above-mentioned configuration, in the mobile terminal apparatus (UE), the channel estimation section 107 performs channel estimation using downlink reference signals. Then, the PMI selecting section 111 selects the PMI using the channel estimation values obtained in the channel estimation section 107. Next, the IQI measuring section 109 calculates the IQI$_{i,UE}^j$ using at least the channel estimation values and PMI. At this point, the IQI measuring section 109 calculates the IQI$_{i,UE}^j$ by equation (5), (7), (9), (10) or (11) according to any one of above-mentioned Aspects 1 to 3. The IQI$_{i,UE}^j$ is transmitted to the radio base station apparatus eNB as feedback.

In the radio base station apparatus eNB, the IQI processing section 219 calculates the IQI using the IQI$_{i,UE}^j$. At this point, the IQI processing section 219 calculates the IQI by equation (5), (7), (9), (10) or (11) according to any one of above-mentioned Aspects 1 to 3. Next, the precoding weight generating section 221 generates precoding weights using the PMIs transmitted as feedback and calculated IQIs. At this point, the precoding weight generating section 221 generates precoding weights by above-mentioned equations (17) to (19). Next, the radio base station apparatus eNB performs coordinated multipoint transmission utilizing MIMO transmission, using the obtained precoding weights.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-047972 filed on Mar. 4, 2011, entire content of which is expressly incorporated by reference herein.

The invention claimed is:

1. A mobile terminal apparatus comprising:
a channel estimation circuit configured to perform channel estimation using a downlink reference signal;
a PMI selecting circuit configured to select a PMI (Precoding Matrix Indicator) using a channel estimation value obtained in the channel estimation circuit;
an IQI measuring circuit configured to measure an IQI (Interference Quality Indicator) using at least the channel estimation value and the PMI; and
a transmission circuit configured to transmit at least the PMI and the IQI to a radio base station apparatus, wherein the base station generates precoding weights using the PMI and the IQI, and performs coordinated multipoint transmission utilizing MIMO transmission using the precoding weights,
wherein the IQI measuring circuit obtains the IQI using at least one equation selected from the group of equations consisting of:

$$IQI_i^j = \frac{P_{avg,i}}{ICI_i + N_i + P_{avg,i} \times \|H_i^i - \lambda_{i,max}^i (F_i^i)^H\|^2} \quad i = j$$

$$IQI_i^j = \frac{P_{avg,j}}{ICI_i + N_i + P_{avg,j} \times \|H_i^j - (F_i^j)^H\|^2} \quad j \neq i$$

$$\lambda_{i,max}^i = \text{max}eigenvalue(H_i^i),$$

$$IQI_i^j = \frac{P_{avg,i}}{ICI_i + N_i + P_{avg,i} \times \|H_i^i - \lambda_{i,max}^i (F_i^i)^H\|^2} \quad i = j$$

$$IQI_i^j = \frac{P_{avg,j}}{ICI_i + N_i + P_{avg,j} \times \|H_i^j - (F_i^j)^H\|^2} \quad j \neq i$$

$$\lambda_{i,max}^i = \text{max}eigenvalue(H_i^i),$$

wherein
$H_i^j$: Downlink channel state;
$F_i^j$: PMI feedback from a mobile terminal apparatus i;

$P_{avg,j}$: Average total transmission power of a radio base station apparatus j;
$ICI_i$: Interference except interference from a cell belonging to a CoMP set in the mobile terminal apparatus i; and
N: Average noise.

2. The mobile terminal apparatus according to claim 1, wherein the IQI measuring circuit obtains a time-averaged IQI using following equation (15):

$$IQI_i^j = (IQI_{i,avg}^j)_{T+1} = \frac{T+1}{\frac{T}{(IQI_{i,avg}^j)_T} + \frac{1}{IQI_{i,T+1}^j}} \quad \text{Eq. (15)}$$

$(IQI_i^j)_{T+1}$: Instantaneous value of IQI in a subframe (T+1);
$(IQI_{i,avg}^j)_{T+1}$: Average value of IQI in a subframe (T+1); and
T+1; Length of a time window to average.

3. The mobile terminal apparatus according to claim 1, wherein the IQI measuring circuit obtains a time-averaged IQI undergoing weighting using following equation (16):

$$IQI_i^j = (IQI_{i,avg}^j)_{T+1} = \frac{1}{\frac{(1-\alpha)}{(IQI_{i,avg}^j)_T} + \frac{\alpha}{IQI_{i,T+1}^j}} \quad 0 < \alpha \leq 1. \quad \text{Eq. (16)}$$

4. A radio base station apparatus comprising:
a precoding weight generating circuit configured to generate precoding weights using a PMI (Precoding Matrix Indicator) and an IQI (Interference Quality Indicator) transmitted from a mobile terminal apparatus as feedback; and
a transmission circuit configured to perform coordinated multipoint transmission utilizing MIMO transmission using the precoding weights, wherein the IQI is based on, in part, at least one equation selected from the group of equations consisting of:

$$IQI_i^j = \frac{P_{avg,j}}{ICI_i + N_i + P_{avg,j} \times \|H_i^j - (F_i^j)^H\|^2}, \forall i, j = 1, 2, 3,$$

$$IQI_i^i = \frac{P_{avg,i}}{ICI_i + N_i} \quad i = j$$

$$IQI_i^j = \frac{P_{avg,j}}{ICI_i + N_i + P_{avg,j} \times \|H_i^j - (F_i^j)^H\|^2} \quad j \neq i, \text{ and}$$

$$IQI_i^i = \frac{P_{avg,i}}{ICI_i + N_i + P_{avg,i} \times \|H_i^i - \lambda_{i,max}^i (F_i^i)^H\|^2} \quad i = j$$

$$IQI_i^j = \frac{P_{avg,j}}{ICI_i + N_i + P_{avg,j} \times \|H_i^j - (F_i^j)^H\|^2} \quad j \neq i,$$

$\lambda_{i,max}^i = \max eigenvalue(H_i^i),$ wherein
$H_i^j$: Downlink channel state;
$F_i^j$: PMI feedback from a mobile terminal apparatus i;
$P_{avg,j}$: Average total transmission power of a radio base station apparatus j;
$ICI_i$: Interference except interference from a cell belonging to a CoMP set in the mobile terminal apparatus i; and
N: Average noise.

5. The radio base station apparatus according to claim 4, further comprising:
an IQI processing circuit configured to obtain the IQI using information necessary for IQI measurement including at least a channel estimation value and the PMI from the mobile terminal apparatus.

6. The radio base station apparatus according to claim 5, wherein the IQI processing circuit obtains a time-averaged IQI using following equation (15):

$$IQI_i^j = (IQI_{i,avg}^j)_{T+1} = \frac{T+1}{\frac{T}{(IQI_{i,avg}^j)} + \frac{1}{IQI_{i,T+1}^j}} \quad \text{Eq. (15)}$$

$(IQI_i^j)_{T+1}$: Instantaneous value of IQI in a subframe (T+1);
$(IQI_{i,avg}^j)_{T+1}$: Average value of IQI in a subframe (T+1); and
T+1: Length of a time window to average.

7. The radio base station apparatus according to claim 5, wherein the IQI processing circuit obtains a time-averaged IQI undergoing weighting using following equation (16):

$$IQI_i^j = (IQI_{i,avg}^j)_{T+1} = \frac{1}{\frac{(1-\alpha)}{(IQI_{i,avg}^j)_T} + \frac{\alpha}{IQI_{i,T+1}^j}} \quad 0 < \alpha \leq 1. \quad \text{Eq. (16)}$$

8. A radio communication method comprising:
in a mobile terminal apparatus,
performing channel estimation using a downlink reference signal;
selecting a PMI (Precoding Matrix Indicator) using the obtained channel estimation value;
measuring an IQI (Interference Quality Indicator) using at least the channel estimation value and the PMI;
transmitting at least the PMI and the IQI to a radio base station apparatus; in the radio base station apparatus,
generating precoding weights using the PMI and the IQI; and
performing coordinated multipoint transmission utilizing MIMO transmission using the precoding weights,
wherein the IQI is measured using at least one equation selected from the group of equations consisting of:

$$IQI_i^j = \frac{P_{avg,j}}{ICI_i + N_i + P_{avg,j} \times \|H_i^j - (F_i^j)^H\|^2}, \forall i, j = 1, 2, 3,$$

$$IQI_i^i = \frac{P_{avg,i}}{ICI_i + N_i} \quad i = j$$

$$IQI_i^j = \frac{P_{avg,j}}{ICI_i + N_i + P_{avg,j} \times \|H_i^j - (F_i^j)^H\|^2} \quad j \neq i, \text{ and}$$

$$IQI_i^j = \frac{P_{avg,j}}{ICI_i + N_i + P_{avg,j} \times \|H_i^j - (F_i^j)^H\|^2}, \forall i, j = 1, 2, 3,$$

$$IQI_i^i = \frac{P_{avg,i}}{ICI_i + N_i} \quad i = j$$

$$IQI_i^j = \frac{P_{avg,j}}{ICI_i + N_i + P_{avg,j} \times \|H_i^j - (F_i^j)^H\|^2} \quad j \neq i, \text{ and}$$

$$IQI_i^i = \frac{P_{avg,i}}{ICI_i + N_i + P_{avg,i} \times \|H_i^i - \lambda_{i,max}^i (F_i^i)^H\|^2} \quad i = j$$

-continued $$IQI_i^j = \frac{P_{avg,j}}{ICI_i + N_i + P_{avg,j} \times \left\| H_i^j - (F_i^j)^H \right\|^2} \quad j \neq i$$

$$\lambda_{i,max}^i = \max eigenvalue(H_i^i),$$

wherein $H_i^j$: Downlink channel state;
$F_i^j$: PMI feedback from a mobile terminal apparatus i;
$P_{avg,j}$: Average total transmission power of a radio base station apparatus j;
$ICI_i$: Interference except interference from a cell belonging to a CoMP set in the mobile terminal apparatus i; and
N: Average noise.

9. A radio communication method comprising:
in a mobile terminal apparatus,
  performing channel estimation using a downlink reference signal;
  selecting a PMI (Precoding Matrix Indicator) using the obtained channel estimation value;
  measuring an IQI (Interference Quality Indicator) using at least the channel estimation value and the PMI;
  transmitting at least the PMI and the IQI to a radio base station apparatus;
in the radio base station apparatus,
  exchanging the PMI and an IQI transmitted as feedback to each radio base station apparatus included in a coordinated cluster between radio base station apparatuses;
  generating precoding weights using PMIs and IQIs of the radio base station and a coordinated base station in each radio base station apparatus in the coordinated cluster; and
  performing coordinated multipoint transmission utilizing MIMO transmission using the precoding weights,
wherein the IQI is measured using at least one equation selected from the group of equations consisting of:

$$IQI_i^j = \frac{P_{avg,j}}{ICI_i + N_i + P_{avg,j} \times \left\| H_i^j - (F_i^j)^H \right\|^2}, \forall i, j = 1, 2, 3,$$

$$IQI_i^i = \frac{P_{avg,i}}{ICI_i + N_i} \quad i = j$$

$$IQI_i^j = \frac{P_{avg,j}}{ICI_i + N_i + P_{avg,j} \times \left\| H_i^j - (F_i^j)^H \right\|^2} \quad j \neq i, \text{ and}$$

$$IQI_i^i = \frac{P_{avg,i}}{ICI_i + N_i + P_{avg,i} \times \left\| H_i^i - \lambda_{i,max}^i (F_i^i)^H \right\|^2} \quad i = j$$

$$IQI_i^j = \frac{P_{avg,j}}{ICI_i + N_i + P_{avg,j} \times \left\| H_i^j - (F_i^j)^H \right\|^2} \quad j \neq i$$

$$\lambda_{i,max}^i = \max eigenvalue(H_i^i),$$

wherein $H_i^j$: Downlink channel state;
$F_i^j$: PMI feedback from a mobile terminal apparatus i;
$P_{avg,j}$: Average total transmission power of a radio base station apparatus j;
$ICI_i$: Interference except interference from a cell belonging to a CoMP set in the mobile terminal apparatus i; and
N: Average noise.

\* \* \* \* \*